Dec. 10, 1935.  H. J. HEINS  2,023,837
MILK DISPENSING DEVICE
Original Filed June 29, 1933
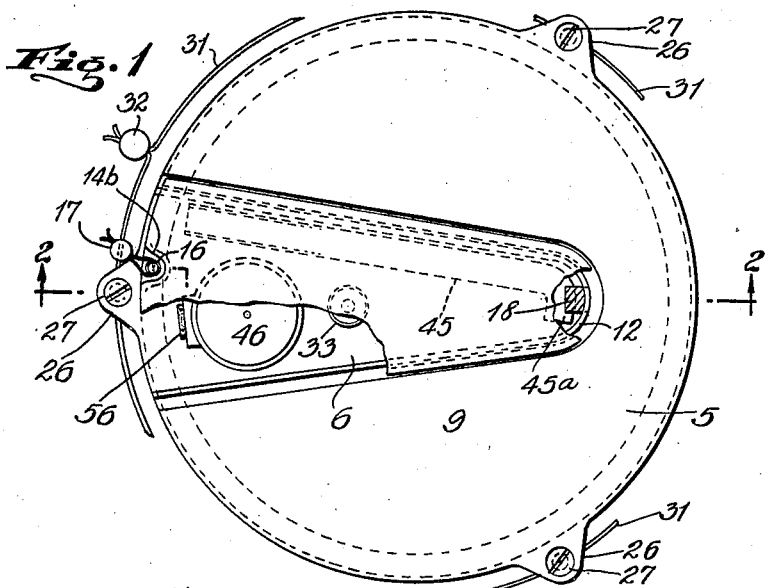
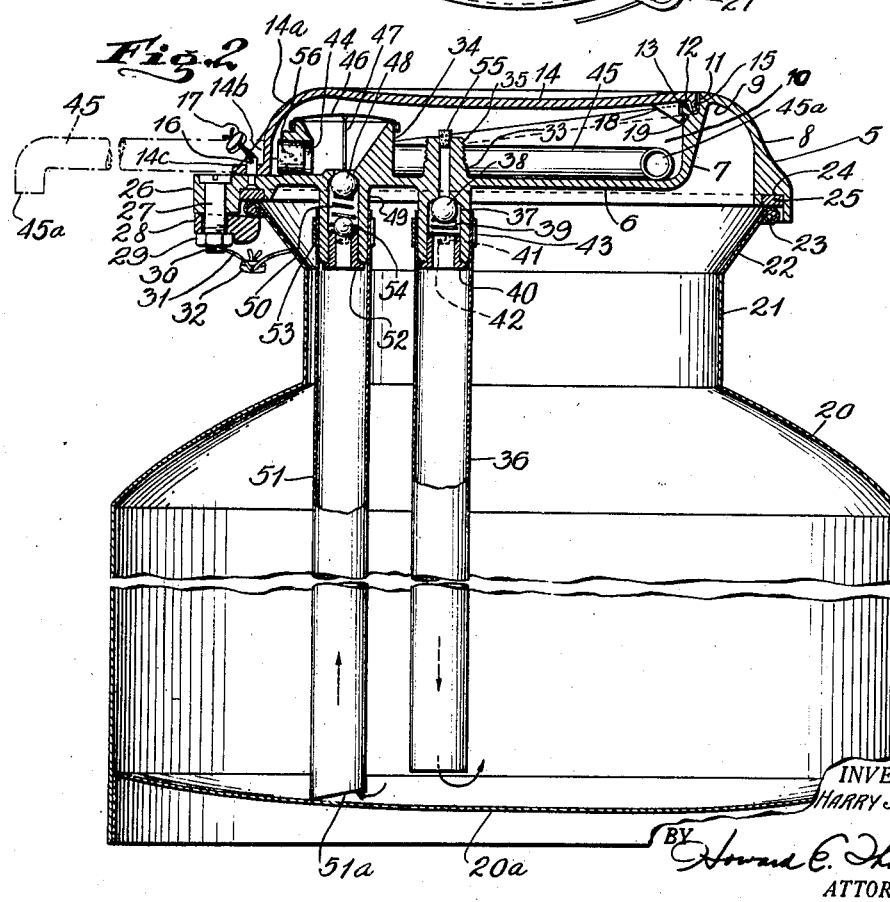
INVENTOR.
HARRY J. HEINS
BY
ATTORNEY Patented Dec. 10, 1935

2,023,837

UNITED STATES PATENT OFFICE 2,023,837

MILK DISPENSING DEVICE

Harry J. Heins, Jersey City, N. J.

Application June 29, 1933, Serial No. 678,170
Renewed May 6, 1935

14 Claims. (Cl. 221—74)

This invention relates to devices for dispensing loose milk and particularly to the provision of a simple and compact form of attachment for a milk container by means of which the milk may be discharged therefrom in a simple, practical and foolproof manner; and the object of the invention is to provide a device of the class described in the form of a cover part including means for supporting two tubes or pipes in connection therewith and to extend into the container, one of said means including means whereby a pressure element, such for example as nitrogen, may be introduced into the container through one of said tubes to agitate the milk in the container and to discharge the same through the other tube; a further object being to provide the last named tube or attaching means with a manually controlled and operated member for controlling and regulating the discharge of milk from the container and by the operation thereof to regulate the amount of milk discharged; a further object being to provide a discharge spout detachably coupled with the cover part and through which the milk from the second named tube is discharged into a suitable container; a further object being to provide the cover with a recess or chamber in which the intake and discharge elements of the device are located and in which the discharge spout is normally positioned when not in use, and to the provision of a cover for said chamber with means for sealing the cover to prevent unauthorized tampering with the attachment; a further object being to provide a simple and yet strong and durable means for securing the cover part of the attachment to the container and to seal the part thereon against unauthorized displacement; and with these and other objects in view, the invention consists in a dispensing device or attachment of the class described which is simple in construction, efficient in use, and which is constructed as hereinafter described and claimed.

The invention is fully disclosed in the following specification, of which the accompanying drawing forms a part, in which the separate parts of my invention are designated by suitable reference characters in each of the views, and in which:

Fig. 1 is a plan view of one of my improved devices shown in attached position with parts of the construction broken away and in section; and, Fig. 2 is a transverse sectional view on the line 2—2 of Fig. 1 with parts of the construction broken away and indicating in dotted lines the operative position of a discharge nozzle which I employ.

In devices of the class under consideration, it is an important factor that the device as constructed have certain requirements to render it practical for use in the dispensing of loose milk, from the standpoint of maintaining proper standardization of the milk dispensed by the attachment, to prevent or obviate the introduction of water or other foreign elements into the container or the milk therein to dilute or otherwise change the characteristics thereof to provide, by agitation, the discharge of the required proportions of butter fat in the quantities or amounts of milk intermittently discharged from the container, and further, to provide a device which by virtue of its design and construction, especially with respect to that part thereof, which is exposed to the interior of the milk container, may be readily cleaned to render the same sanitary during the continued and repeated use thereof.

In the accompanying drawing, I have shown for the purpose of illustrating one method of carrying my invention into effect, an attachment consisting of a main body 5, which for the purpose of this description may be termed a cover part. This part consists of a central flat wall portion of triangular shape as viewed in plan, the inner end being contracted and the outer end adjacent the periphery of the part 5 being flared and comparatively wide. Bordering the top wall 6 is a vertical wall portion 7 which joins an outer vertical wall portion 8 through a top wall 9, the latter extending from the boundaries of the vertical wall 7 to the periphery of the vertical walls 8 of the part 5, the wall 9 being comparatively narrow at the inner end of the wall 6. A chamber 10 is formed in the part 5 above the wall 6 and within the wall 7. It will appear that this structure forms what might be termed a cup-shaped or disk-shaped casing, the central portion of which is depressed to form the chamber 10. The upper end of the wall 7 is grooved as seen at 11 and also includes a tongue 12 which fits in a corresponding groove 13 formed in a supplemental cover part 14, the latter having a peripheral flange 15 which enters the groove 11, it being understood that the supplemental cover 14 is of a contour consistent with that of the walls 6, 7 but tapering downwardly to the flared end as indicated in dotted lines in Fig. 2. The outer flared end of the supplemental cover terminates in a downwardly and outwardly flared end portion 14a which is notched or recessed as seen at 14b to receive a key and sealing pin 16, which passes through an apertured flange portion 14c, the pin being secured to the top wall 6 at the peripheral edge thereof and having an aperture above the flange 14c to receive a conventional seal 17, preventing unauthorized removal of the supplemental cover 14. The inner end of the supplemental cover 14 includes a downwardly and outwardly projecting hook-shaped lug 18, cooperating with a recess 19 formed in the wall 7 adjacent the tongue or flange 12 and to retain said inner end against displacement and prevent the removal of the supplemental cover 14 until the seal 17 is broken. It will be noted that the central portion of the supplemental cover 14 is depressed and the entire cover is contained within the boundaries of the top wall 9 of the main cover part 5 so that when the several cans or containers 20 are placed one upon the other, the supplemental cover part will not be subjected to any stress or strain.

The can or container 20 which is indicated in Fig. 2 of the drawing is of more or less conventional type and includes a reduced neck portion 21 terminating at the open end of the can in an outwardly flared part 22, beaded and reinforced by a ring 23 at its free edge. The cover part 5 includes at the periphery of the lower surface thereof an annular groove 24 in which may be placed a suitable packing 25 which rests upon the body or ring 23 to form an air tight seal between the cover 5 and container.

At circumferentially spaced intervals, the cover part 5 is provided with outwardly projecting bolt lugs 26, in which bolts 27 are mounted with their heads preferably countersunk in the lugs. Mounted on the lower ends of the bolts are clamp blocks 28 which engage the lower surfaces of the bead or ring 23, and by tightening the nuts 29 on the bolts, the blocks 28 will serve to firmly clamp and seal the cover 5 in connection with the can. The outer ends of the bolts are provided with apertures 30, and a seal wire 31 is passed through the apertures 30 of all of the bolts and the ends secured by a conventional seal 32.

The wall 6 of the cover part 5 is provided with tubular bodies 33 and 34 disposed within the chamber 10 and also extending below the bottom of the wall 6 and into the container 20 as seen, the body 33 being externally threaded at its upper end as seen at 35 to receive a suitable coupling on the end of a pipe or tube through which a pressure element from a source of supply passes into and through the tubular body 33, and thus into the lower end portion of the container 20 through a tube 36. It is preferred that nitrogen gas be employed as the pressure element, especially for the reason that this element is an inert gas and will have no detrimental effect upon the milk.

The lower end of the tubular body 33 is enlarged as seen at 37, and fitting therein is a ball check valve 38 held in seated position by a spring 39, the spring seating on a sleeve 40 detachably mounted within the enlarged end 37 of the body 33 by providing a bayonet slot or groove 41 in the outer surface of the sleeve engaging a pin 42 in the enlargement 37. The tube 36 has a close fit upon the enlargement 37 and may be secured in position in any desired manner, such for example, as by a split spring ring or collar 43.

The body 34 includes a tubular extension 44 which is directed outwardly toward the periphery of the cover part 5 and is adapted to receive, as is indicated in dotted lines in Fig. 2 of the drawing, a discharge nozzle or spout 45 which has a tight fit within the tubular extension 44, and when connected, will dispose the spout end 45a thereof outwardly of the cover as well as the container 20 so as to facilitate the placement of a receiving receptacle beneath the discharge end of the spout for the reception of milk discharged from the container. As seen in Fig. 1 of the drawing, the spout 45 is normally contained within the chamber or compartment 10, and in shipment and transportation, this spout may be wrapped in suitable material to prevent shifting thereof or injury thereto in transportation of the container or means may be provided for holding the same in predetermined position.

Detachably mounted in connection with the upper end of the body 34 is a flexing diaphragm 46 carrying centrally thereof a depending rod or needle 47 adapted to engage a ball valve 48 seated in the upper end of a tubular extension 49 of the body 34 so as to unseat said valve against the tension of a spring 50 to control the discharge of milk from the container, it being understood that the body of milk in the container 20 is under the constant pressure supplied through the pipe or tube 36, and the opening of the valve 48 will cause the milk to be forced upwardly through a tube 51 coupled with the extension 49 and thus out through the body 34 and the nozzle or spout 45.

The spring 50 seats on a sleeve 52 similar in all respects to the sleeve 40, and it is understood at this time that the sleeves 40 and 52 are detachably mounted for the purpose of cleaning out the apparatus and to remove the springs and ball valves for this purpose or to replace any of the parts. The discharge tube 51 preferably fits snugly upon the extension 49 and yet has a slidable movement thereon so as to compensate for differences in dimensions between the wall 6 and the bottom wall 20a of the container, so that the tapered lower end 51a of the tube may be positioned at the bottom of the container so as to insure the discharge of practically all of the milk from the container, the tube 51 having a spring clamp or ring 53 which aids in supporting the same upon the extension 49.

This is especially true if the tube 51 is composed of paper treated to render the same moisture proof, or of any other fibrous material including parchment, it being understood, however, that plain and relatively thin metal tubes may be employed, as these tubes may be readily cleaned by virtue of the simplicity of the contour thereof, whereas if the paper or fibrous tubes are employed, they may be dispensed with after one use and new tubes substituted avoiding the necessity of cleaning.

Arranged in the extension 49 is a ball check valve 54 which seats upon the sleeve 52. The purpose of this valve is to prevent the introduction of any foreign element or fluid into the container through the nozzle 45 or the tubular extension 44, and it will be understood that the check valve 54 will be unseated by the flow of milk when the dispensing device is in operation.

The use of my improved device will be readily understood from the foregoing description when taken in connection with the accompanying drawing and the following statement. After the container or can 20 has been filled with milk to be dispensed, the unit dispensing attachment is mounted upon the upper end of the can and clamped thereto by the blocks 28, and it is preferred that the outlet of the tubular body 35 be plugged with a cork or the like 55, and a similar cork 56 be inserted in the tubular extension 44, the nozzle 45 is placed in the chamber 10 and the supplemental cover 14 placed in position by first coupling the lock lug 18 with the recessed flange 12 and then moving the same downwardly, passing the outer end over the pin 16, and when in position, the seal 17 as well as the seal 32 are applied.

In placing the attachment on the can, it will be understood that the tube 51 will be left sufficiently long so as to engage the bottom of the can and be raised on the extension 49 in the operation of securing the cover part 5 in position on the can.

The can or container is now ready for shipment to the point of distribution, and in the operation of dispensing the milk, the dealer or distributor breaks the seal 17 and removes the supplemental cover part 14, then places the discharge spout or nozzle in the extension 44 after removing the plug 56, the plug 55 is then removed and the pressure element supply tube is coupled with the threaded end 35 of the body 33, and the pressure element is introduced into the tank sufficiently to start the removal of the milk from the nozzle which may be judged by testing or simply by introducing a fixed or predetermined pressure into the tank, as will be apparent. In dispensing the milk, it will be understood that the nitrogen gas or other pressure element passing upwardly through the milk in the container or can, will serve to agitate the milk and maintain the required proportions of butter fat in the milk dispensed from the container.

At this time, it will also be understood that in applying the attachment to the container, the valve 48 will be opened by the action of the diaphragm 46 and a pin or rod may be inserted into the body 33 to open the valve 38 so as to allow air to be discharged through the tubular members, permitting the milk of the container to rise in both of the tubes 36 and 51, and it will thus be seen that both of these tubes will contain a proportionate amount of the butter fat when delivery is made to the dealer.

It will be understood that I am not necessarily limited to the precise structural features herein shown and described nor to the specific arrangement thereof illustrated, and further, my invention is not necessarily limited to the mounting of the dispensing unit in connection with a can or container of any particular form and construction, and in fact, while I have described my invention as primarily adapted for use in the dispensing of milk, the same may be used for dispensing other fluids, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A dispensing unit of the class described comprising a disk-shaped casing having a large depressed portion forming a chamber therein opening outwardly through the casing, two tubular bodies on the casing with parts of both of said bodies disposed within the boundaries of said chamber and with other parts protruding beyond the bottom of the casing, tubes detachably mounted with respect to said bodies and extending from the lower ends thereof, one of said tubular bodies and tubes constituting the discharge of the device, and the other body and tube a pressure element admission means, the unit being detachably supported in connection with a container into which said tubes pass, and a cover detachably supported on the casing and of a contour conforming with the contour of the boundaries of said chamber to form a closure for said chamber and the tubular bodies therein when the unit is not in use.

2. A dispensing unit of the class described comprising a disk-shaped casing having a large depressed portion forming a chamber therein opening outwardly through the casing, two tubular bodies on the casing with parts of both of said bodies disposed within the boundaries of said chamber and with other parts protruding beyond the bottom of the casing, tubes detachably mounted with respect to said bodies and extending from the lower ends thereof, one of said tubular bodies and tubes constituting the discharge of the device and the other body and tube a pressure element admission means, the unit being detachably supported in connection with a container into which said tubes pass, and a cover detachably supported on the casing and of a contour conforming with the contour of the boundaries of said chamber to form a closure for said chamber and the tubular bodies therein when the unit is not in use, and a discharge spout normally contained within said chamber and adapted to be detachably coupled with the discharge tubular body when said cover is removed.

3. A dispensing unit of the class described comprising a disk-shaped casing having a large depressed portion forming a chamber therein opening outwardly through the casing, two tubular bodies on the casing with parts of both of said bodies disposed within the boundaries of said chamber and with other parts protruding beyond the bottom of the casing, tubes detachably mounted with respect to said bodies and extending from the lower ends thereof, one of said tubular bodies and tubes constituting the discharge of the device and the other body and tube a pressure element admission means, the unit being detachably supported in connection with a container into which said tubes pass, and a cover detachably supported on the casing and of a contour conforming with the contour of the boundaries of said chamber to form a closure for said chamber and the tubular bodies therein when the unit is not in use, a discharge spout normally contained within said chamber and adapted to be detachably coupled with the discharge tubular body when said cover is removed, and a manually actuated valve in said tubular discharge body for controlling the discharge of a fluid from said container therethrough.

4. A dispensing unit of the class described comprising a disk-shaped casing having a depressed portion forming a chamber therein opening outwardly through the casing, two tubular bodies on the casing with parts thereof disposed within the boundaries of said chamber and with other parts protruding beyond the bottom of the casing, tubes detachably mounted with respect to said bodies and extending from the lower ends thereof, one of said tubular bodies and tubes constituting the discharge of the device and the other body and tube a pressure element admission means, the unit being detachably supported in connection with a container into which said tubes pass, and a cover detachably supported on the casing to form a closure for said chamber and the tubular bodies therein when the unit is not in use, a discharge spout normally contained within said chamber and adapted to be detachably coupled with the discharge tubular body when said cover is removed, a manually actuated valve in said tubular discharge body for controlling the discharge of a fluid from said container therethrough, and a diaphragm detachably coupled with the discharge body and by means of which the discharge valve is controlled.

5. A dispensing unit of the class described comprising a disk-shaped casing having a depressed portion forming a chamber therein opening outwardly through the casing, two tubular bodies on the casing with parts thereof disposed within the boundaries of said chamber and with other parts protruding beyond the bottom of the casing, tubes detachably mounted with respect to said bodies and extending from the lower ends thereof, one of said tubular bodies and tubes constituting the discharge of the device and the other body and tube a pressure element admission means, the unit being detachably supported in connection with a container into which said tubes pass, and a cover detachably supported on the casing to form a closure for said chamber and the tubular bodies therein when the unit is not in use, a discharge spout normally contained within said chamber and adapted to be detachably coupled with the discharge tubular body when said cover is removed, a manually actuated valve in said tubular discharge body for controlling the discharge of a fluid from said container therethrough, a diaphragm detachably coupled with the discharge body and by means of which the discharge valve is controlled, and another valve in said discharge body preventing the introduction of a fluid into the container through said discharge body.

6. The combination with a milk container, of a dispensing unit detachably coupled with the container, said unit forming a cover part for the container, intake and discharge couplings on the unit and opening outwardly therethrough and including tubular parts protruding into the container, tubes slidably mounted on said parts and extending into the container to a point adjacent the bottom of the container, means whereby a pressure element may be introduced into the intake coupling and the tube thereof for passage into the bottom of the container, a discharge spout detachably coupled with the discharge coupling, the free end of the spout extending to a point beyond the periphery of said unit and container and through which the milk of the container is discharged in the introduction of the pressure element thereinto, and a manually actuated valve in the discharge coupling controlling the discharge of milk from the container.

7. The combination with a milk container, of a dispensing unit detachably coupled with the container, said unit forming a cover part for the container, intake and discharge couplings on the unit and opening outwardly therethrough and including tubular parts protruding into the container, tubes slidably mounted on said parts and extending into the container to a point adjacent the bottom of the container, means whereby a pressure element may be introduced into the intake coupling and the tube thereof for passage into the bottom of the container, a discharge spout detachably coupled with the discharge coupling, the free end of the spout extending to a point beyond the periphery of said unit and container and through which the milk of the container is discharged in the introduction of the pressure element thereinto, a manually actuated valve in the discharge coupling controlling the discharge of milk from the container, and check valves in said intake and discharge couplings.

8. The combination with a milk container, of a dispensing unit detachably coupled with the container, said unit forming a cover part for the container, intake and discharge couplings on the unit and opening outwardly therethrough and including tubular parts protruding into the container, tubes slidably mounted on said parts and extending into the container to a point adjacent the bottom of the container, means whereby a pressure element may be introduced into the intake coupling and the tube thereof for passage into the bottom of the container, a discharge spout detachably coupled with the discharge coupling, the free end of the spout extending to a point beyond the periphery of said unit and container and through which the milk of the container is discharged in the introduction of the pressure element thereinto, a manually actuated valve in the discharge coupling controlling the discharge of milk from the container, and means on the periphery of the unit for detachably clamping the unit to the container and to form a seal between the unit and container.

9. The combination with a milk container, of a dispensing unit detachably coupled with the container, said unit forming a cover part for the container, intake and discharge couplings on the unit and opening outwardly therethrough and including tubular parts protruding into the container, tubes slidably mounted on said parts and extending into the container to a point adjacent the bottom of the container, means whereby a pressure element may be introduced into the intake coupling and the tube thereof for passage into the bottom of the container, a discharge spout detachably coupled with the discharge coupling, the free end of the spout extending to a point beyond the periphery of said unit and container and through which the milk of the container is discharged in the introduction of the pressure element thereinto, a manually actuated valve in the discharge coupling controlling the discharge of milk from the container, and said unit having a large depressed chamber opening through the top and periphery wall thereof and both of said couplings being disposed in said chamber.

10. In a dispensing unit of the class described, a casing forming a cover part for the container in connection with which the unit is employed, said casing comprising an annular rim portion including means for detachably clamping the casing to a container, the body portion of the casing projecting upwardly and inwardly to form an outer supporting wall, said wall being recessed to form therewithin a chamber opening through the top and one edge of said wall, and intake and discharge couplings on said casing with parts thereof projecting into and disposed within the boundaries of said chamber, and with parts extending below the casing for admission into the container in connection with which the unit is attached.

11. In a dispensing unit of the class described, a casing forming a cover part for the container in connection with which the unit is employed, said casing comprising an annular rim portion including means for detachably clamping the casing to a container, the body portion of the casing projecting upwardly and inwardly to form an outer supporting wall, said wall being recessed to form therewithin a chamber opening through the top and one edge of said wall, intake and discharge couplings on said casing with parts thereof projecting into and disposed within the boundaries of said chamber and with parts extending below the casing for admission into the container in connection with which the unit is attached, a nozzle detachably mounted with the discharge coupling, said nozzle when mounted in position extending outwardly through the open side of said chamber, and said nozzle when detached being supported within the boundaries of said chamber.

12. In a dispensing unit of the class described, a casing forming a cover part for the container in connection with which the unit is employed, said casing comprising an annular rim portion including means for detachably clamping the casing to a container, the body portion of the casing projecting upwardly and inwardly to form an outer supporting wall, said wall being recessed to form therewithin a chamber opening through the top and one edge of said wall, intake and discharge couplings on said casing with parts thereof projecting into and disposed within the boundaries of said chamber and with parts extending below the casing for admission into the container in connection with which the unit is attached, a cover for closing said chamber and said cover substantially conforming to the contour of said casing.

13. In a dispensing unit of the class described, a casing, a discharge coupling in said casing including a tubular part extending downwardly from the bottom wall of the casing, a discharge passage in the coupling at the top of the casing and opening outwardly through one side thereof, a manually actuated valve in said coupling controlling communication between the tubular part and said discharge passage, an elongated tube detachably mounted in connection with the tubular part of said coupling for conveying the fluid to be dispensed to the coupling and the discharge passage thereof, said last named tube being composed of fibrous material and slidably engaging the tubular part of said coupling, and a check valve in said tubular part.

14. In a dispensing unit of the class described, a casing, a discharge coupling in said casing including a tubular part extending downwardly from the bottom wall of the casing, a discharge passage in the coupling at the top of the casing and opening outwardly through one side thereof, a manually actuated valve in said coupling controlling communication between the tubular part and said discharge passage, an elongated tube detachably mounted in connection with the tubular part of said coupling for conveying the fluid to be dispensed to the coupling and the discharge passage thereof, said last named tube being composed of fibrous material and slidably engaging the tubular part of said coupling, a check valve in said tubular part, a spring for supporting the valve in closed position, and means including a diaphragm supported on said coupling for moving the valve into open position.

HARRY J. HEINS.